Jan. 12, 1937.   W. E. ANDREWS   2,067,372
PIPE HOLDER AND PULLER
Filed Dec. 12, 1935
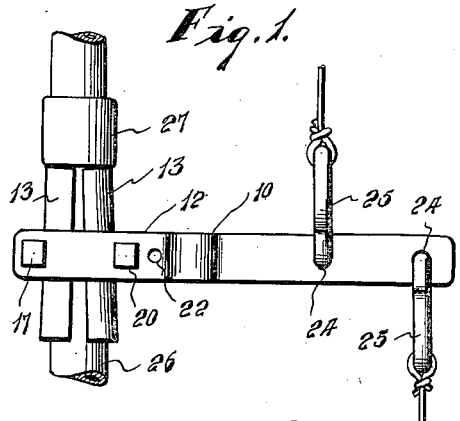
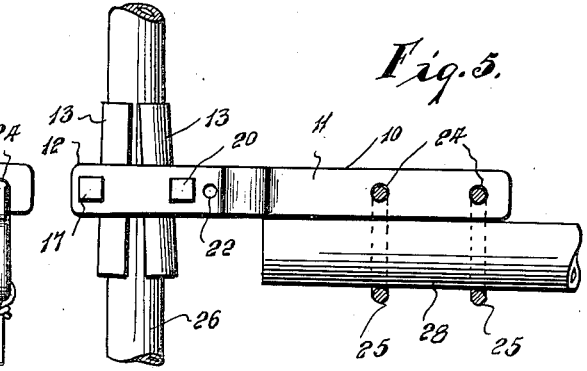
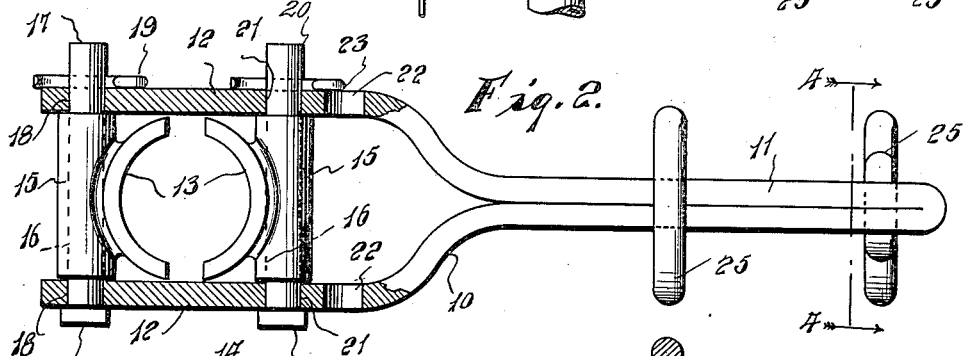
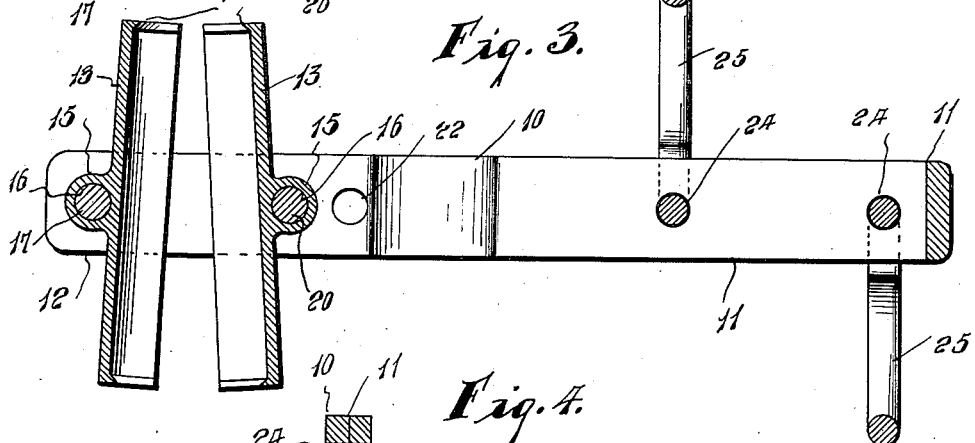
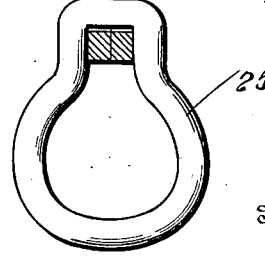
Inventor
W. E. Andrews,
By L. F. Randolph Jr.
Attorney Patented Jan. 12, 1937

2,067,372

UNITED STATES PATENT OFFICE 2,067,372

PIPE HOLDER AND PULLER

William E. Andrews, Hurley, S. Dak.

Application December 12, 1935, Serial No. 54,118

2 Claims. (Cl. 294—92)

This invention relates to a pipe holder or puller, particularly adapted for use in the repairing of wells, both in pulling pipes and in replacing the pipe.

It is aimed to provide a construction which may be readily applied even over a pipe coupling and will hold at any location on the pipe and which will not crush or bend old pipes during its operation, and may further be used without removing the pump if in place.

In addition, it is aimed to provide a structure which may be adjusted for pipes of different sizes and which has a section or jaw removable to facilitate application to certain types of pipe.

The more specific objects and advantages will become apparent from a consideration of the description following taken in connection with accompanying drawing illustrating an operative embodiment.

In said drawing:—

Figure 1 is a view of the device in side elevation, engaged with a pipe at a coupling thereof;

Figure 2 is a view of the tool partly in plan and partly in horizontal longitudinal section;

Figure 3 is a vertical sectional view through the tool; and

Figure 4 is a cross section taken on the line 4—4 of Figure 2; and

Figure 5 is a side elevation of the tool applied to a pipe with a handle attached.

Referring specifically to the drawing wherein like reference characters designate like or similar parts, the tool comprises a lever 10 which may be made from a single strap of metal doubled upon itself as at 11 and having spaced or bifurcated terminal arms 12.

A pair of similar jaws are employed at 13, the same preferably being substantially semi-circular in cross section and at their upper and lower edges having biting or gripping ribs at 14. Midway of the length of the jaws 13, barrels 15 are provided integral therewith, having their bores 16 disposed at a right angle to the longitudinal axis of the jaws.

One of said jaws is fastened between the arms 12 by means of a removable bolt 17 passed through alined openings 18 in the arms 12 and through the barrel of that jaw, the bolt being held in place by a removable cotter key 19, or by other suitable fastening means. The companion jaw is fastened in place by a bolt 20 similar to that at 17, and selectively passed through alined openings 21 or alined openings 22 of the arms 12, according to the size of the pipe to be engaged. A cotter key 23 removably secures the bolt 20 in position. It will be realized that the jaws will hang at an angle to each other normally, as shown in Figures 1, 3, and 5.

The aforesaid returned portion or shank 11 has openings therethrough at 24, in which a pair of open links 25 are pivoted, as shown, the end link being so positioned that it may be located on the opposite side of the shank of the other link or be arranged on the same side of the shank, as shown in Figure 5.

It will be realized that when the lever 10 is moved, there will be relative movement between the jaws so that they will engage, grip or clamp the pipe or tubing shown at 26.

The tool is used both in pulling the pipe and in replacing the pipe. The power used may operate a block and tackle which is hooked into either of links 25. The jaws are adapted to be disposed in parallelism so that they may pass over a coupling on the pipe as at 27. When a pump is installed and in operation on the well, the left hand jaw 13 may be removed and the pipe engaged in the other jaw, whereupon the first jaw is replaced. Larger pipe may be engaged by adjusting the right hand jaw 13 through positioning of its bolt 20 in the opening 22.

In the act of raising pipe, the small rope may be tied in the ring at the right hand end of Figure 1 to pull the tackle back to the operator, and the machine will travel down the pipe itself. In lowering the pipe, the machine or tool is pulled to the top with the block and tackle by keeping the rope in the right hand ring in Figure 1 tight enough to prevent the jaws grabbing. When the tool travels to the top of the pipe, the coupling, as at 27, will stop the rise of the tool.

The tool will not pull off of the pipe over a coupling, as the weight of the jaws always holds them closer together at the top, as previously mentioned. The tool may be used with either side of the jaws uppermost, and it cannot be attached to the pipe incorrectly.

When the device is used as a pipe holder, a length of pipe or other handle, as at 28, is disposed in the loops 25, both arranged at the same side of shank 11.

Various changes may be resorted to provided they fall within the spirit and scope of the invention.

I claim as my invention:—

1. A tool of the class described, comprising a lever having spaced arms, jaws facing each other disposed between said arms and extending above and below the arms, pivot members connecting said jaws to said arms, said jaws having barrels disposed transversely thereof on their outer sides through which the pivot members pass, said pivot members and barrels mounting the jaws offcenter so that by gravity they are urged closer together at their upper ends than at the lower ends, gripping means on opposite ends of said jaws, and said arms having a series of openings selectively accommodating one of said pivot members.

2. A tool of the class described, comprising a lever having spaced arms, jaws facing each other disposed between said arms and extending above and below the arms, pivot members connecting said jaws to said arms, said jaws having barrels disposed transversely thereof on their outer sides through which the pivot members pass, said pivot members and barrels mounting the jaws offcenter so that by gravity they are urged closer together at their upper ends than at the lower ends, gripping means on opposite ends of said jaws, said arms having a series of openings selectively accommodating one of said pivot members, said lever comprising a strap return portion from which said arms extend, and link means pivoted on said return portion.

WILLIAM E. ANDREWS.